Patented Dec. 22, 1936

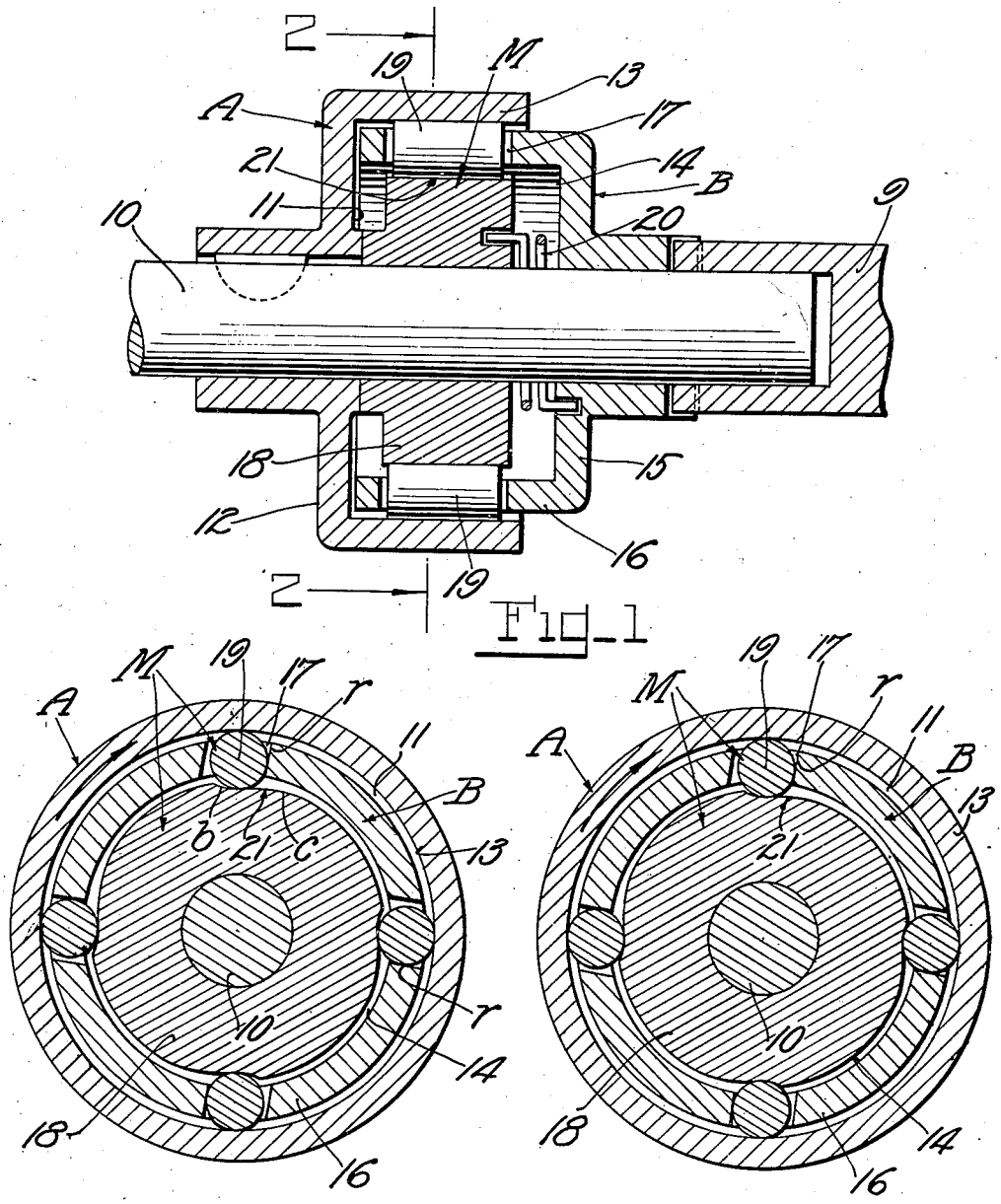

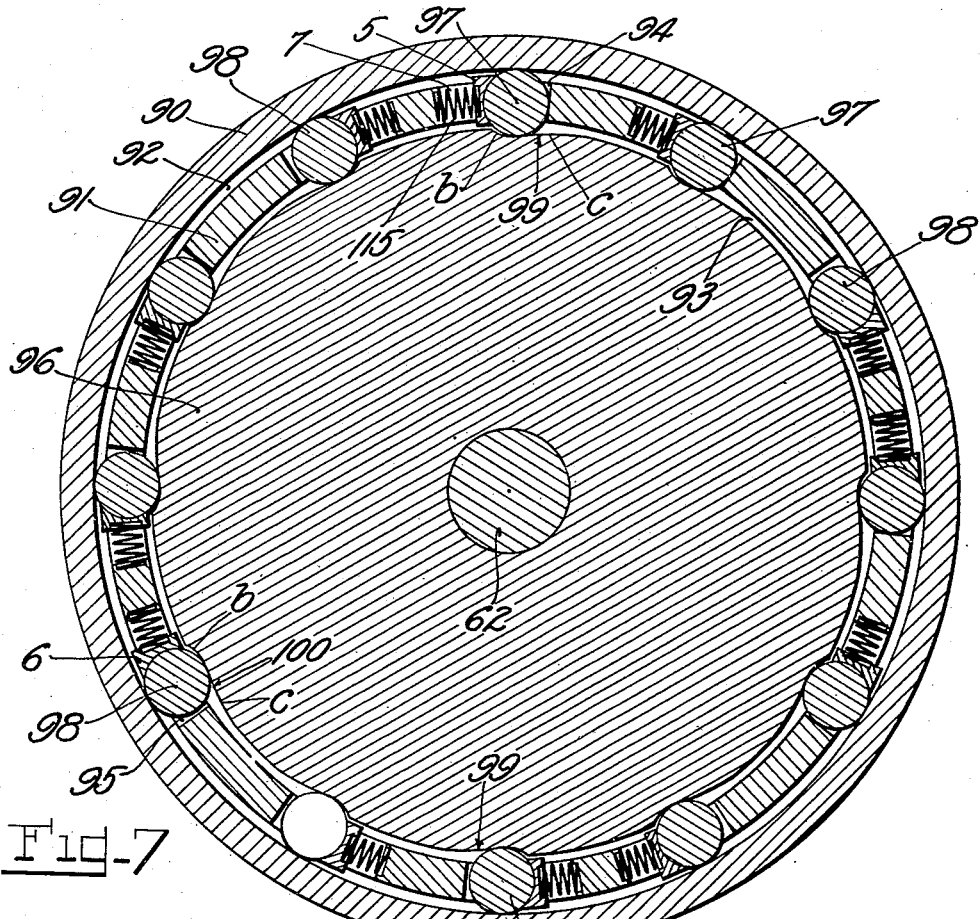
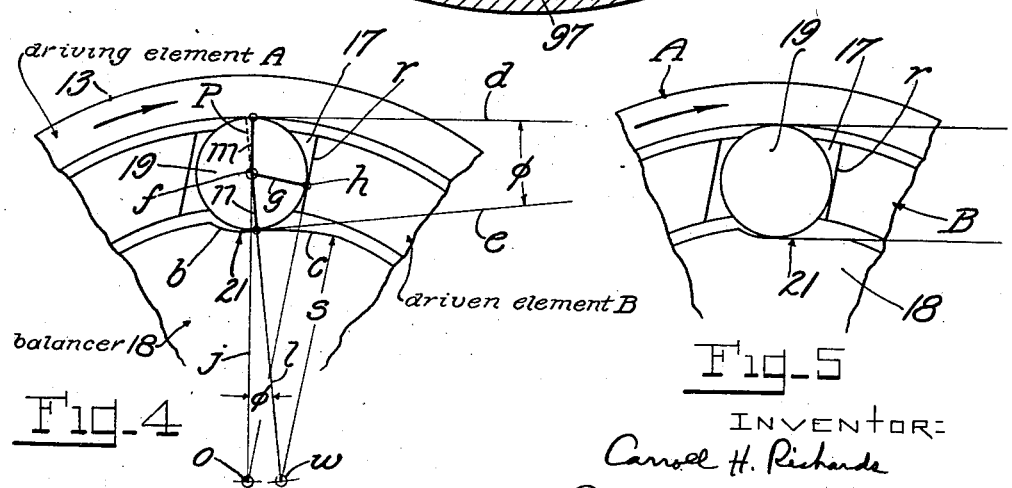

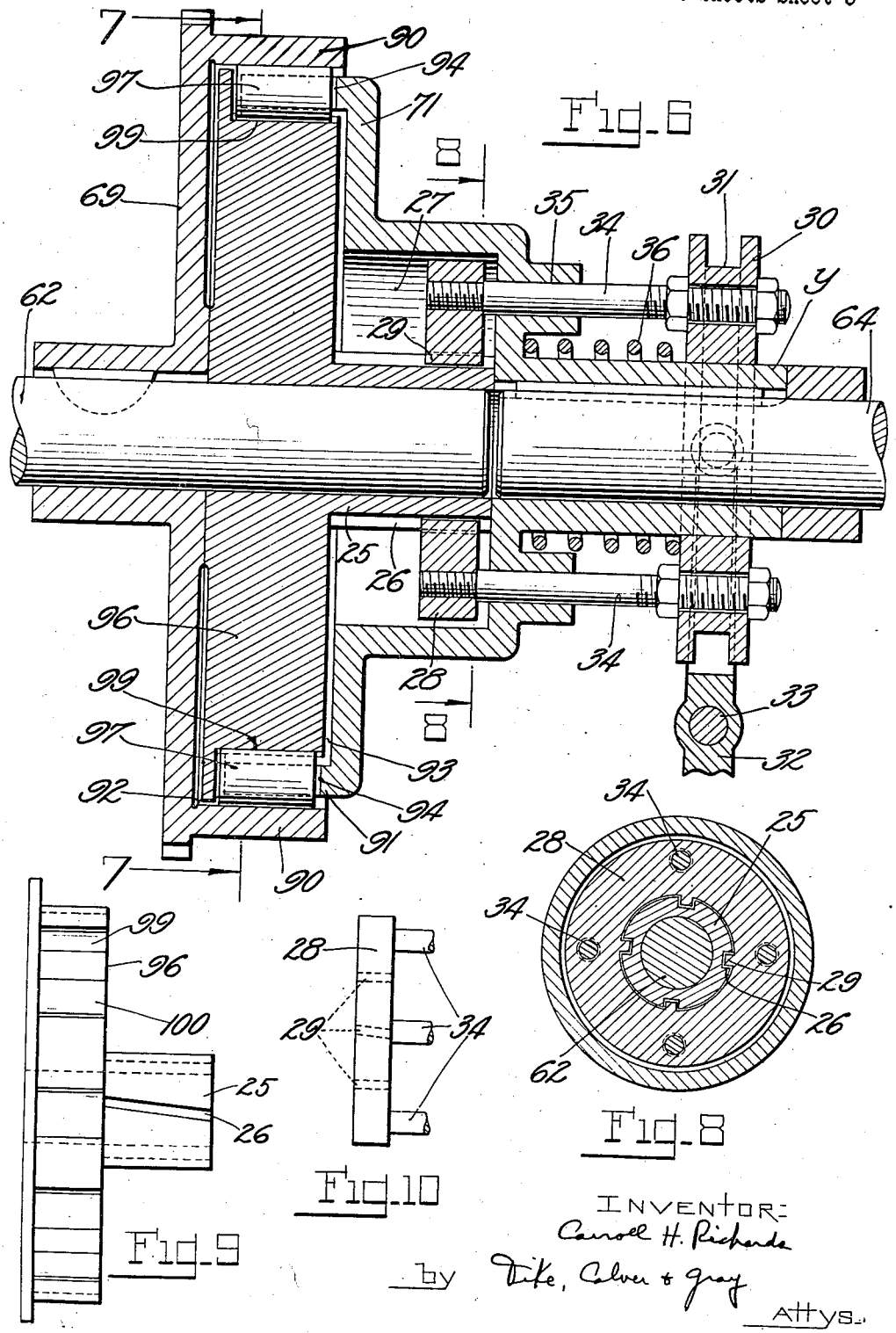

2,065,244

UNITED STATES PATENT OFFICE 2,065,244

CLUTCH

Carroll H. Richards, Wellesley, Mass.

Original application March 11, 1933, Serial No. 660,399. Divided and this application March 21, 1935, Serial No. 12,183

6 Claims. (Cl. 192—56)

This invention relates to mechanism for connecting two members to transmit the force or power supplied to or generated by one to the other and has as one object the provision of a simple and practical mechanism for this purpose. This application is a division of my co-pending application Serial No. 660,399, filed March 11, 1933.

Other objects of the invention will be understood from the following description in conjunction with the accompanying drawings; in which, Fig. 1 is a sectional view of a mechanism illustrative of some of the important features of the invention;

Figs. 2 and 3 are sectional views taken on the line 2—2 of Fig. 1 and showing the parts in different relative positions assumed during operation of the mechanism;

Figs. 4 and 5 are diagrams illustrating the operating principle of the invention.

Fig. 6 is a longitudinal sectional view of a mechanism embodying the invention;

Figs. 7 and 8 are sections taken on lines 7—7 and 8—8 respectively of Fig. 6.

Figs. 9 and 10 are detail views of parts of the construction shown in Fig. 6.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The mechanism shown in Figs. 1 to 5 inclusive is illustrative of some of the important features of the invention. This mechanism comprises a driving element A, a driven element B and torque balancing mechanism M which constitutes the driving connection between said elements. The driving element A is keyed or otherwise secured to a power shaft 10 and is provided with an axial bore 11. The bore 11 extends only partially through the element A, being defined by an end wall 12 and side walls 13 which, as shown, shape said element into the form of a hollow cylinder open at one end. The driven element B is similarly shaped, being provided with an axial bore 14 defined by an end wall 15 and side walls 16. The side walls 16 are provided with a series of rectangular axially extending slots 17. Each slot is defined at one side thereof by a surface $r$, preferably, radially disposed relative to the element B the surfaces $r$ of the several slots forming corresponding sides thereof. The exterior diameter of the element B is somewhat less than the diameter of the bore 11 of the element A. The element B is rotatably mounted on the power shaft 10 with its open end extending into the bore 11 of the element A, and its opposite end interengaged with a propeller shaft 9.

The torque balancing mechanism M comprises a balancing member 18, a series of rollers 19 adapted to releasably connect the balancer with the driving element A and a spring 20 surrounding the shaft 10 with one end engaging the element B and the other end engaging the member 18 and tending to hold said parts in driving relation as shown in Fig. 2. The balancer 18 is loosely mounted on the power shaft 10 within the bore 14 of the driven element B. It is provided with a series of axially extending recesses 21, receiving the rollers 19 which extend through the slots 17. Each recess 21 comprises an inoperative portion $b$ and an operative portion $c$. The inoperative portion $b$, preferably, conforms to the shape of the rollers and extends inwardly from the side edge of the recess to determine the maximum depth of the latter, at which point it joins the portion $c$ which extends therefrom in a reverse arc to the other edge of said recess. The design of this latter portion of the recess has an important bearing on the operation of the mechanism and will be hereinafter more fully described.

When the driving element A is rotated in the direction indicated by the arrows in Figs. 2 to 5 inclusive, it tends to move the rollers 19 into engagement with the surfaces $r$ of the slots 17 in the driven element B and also to move the rollers along the operative portions $c$ of the recesses 21 to wedge the rollers between the member 18 and driving element A and thereby provide a driving connection between the elements A and B. This driving connection is effected or disrupted depending upon the relative magnitude of the opposed forces responsive to the driving torque of the driving element A and responsive to the resisting torque of the driven element B. This driving connection is effected when the former force exceeds the latter and is disrupted when the latter force exceeds the former by a predetermined amount controlled by the character of the operative portion $c$ of the recesses 21.

The resisting force of the driven element B necessary to break the driving connection is determined by the angle formed by the lines of action of the forces exerted between the driving element A and the roller 19, and between the roller 19 and the balancer 18. These lines are common tangents, one of which, indicated at $d$ (Fig. 4) is tangent to the roller 19 and inner surface of the wall 13 of the driving element A at their point of engagement while the other of which, indicated at $e$, is tangent to the operative portion $c$ of the recess 21 and the roller 19 at their point of engagement, which angle is indicated at $\phi$ in Fig. 4.

Referring to the diagram of Fig. 4 the action of the roller 19 will be similar to that of a lever, the arms $m$ and $n$ of which are perpendicular to the lines $d$ and $e$ respectively, $f$ representing the fulcrum. Since the surface $r$ of the driven element that is engaged by the roller 19 is radial with respect to the center of rotation $o$, the line of action of the resisting force of the driven element B at the point of engagement of these parts must be perpendicular to said surface $r$. This line of force is indicated at $g$ and is tangent to a circle the radius of which extends from the center of rotation $o$ to said point of engagement. Since the radial surface $r$ is tangent to the roller 19 at the point $h$, the line of force $g$ must pass through the center of said roller which is the fulcrum $f$ of the lever $m$ $n$. This proves, therefore, that the lever arms $m$ and $n$ are equal for all positions of the roller relative to the other parts of the mechanism. Since the lever arms $m$ and $n$ are equal, the driving force applied to the end of arm $m$ by the driving element creates an equal and opposite force acting at the end of arm $n$ tending to drive the balancer 18 in a direction opposed to that of the drive and to wedge the roller 19 between the balancer 18 and the driving element. When the force of the driven element exceeds the force of the driving element, the tendency of the roller 19 to pivot about the fulcrum $f$ ceases and the force responsive to the driven element tends to pivot the roller 19 about its line of contact with the driving element. This also tends to wedge the roller 19 between the balancer 18 and the driving element, thus tending to increase the force exerted by the roller upon the balancer due to the wedging action. Since the balancer is freely rotatable, this increase in force exerted by the roller upon the balancer causes the balancer to move in the direction of the driving element to disrupt the driving connection between the driving and driven elements.

The pressure P exerted by the driving force K on the balancer 18 may be found by reference to the triangle having two of its sides formed by the force lines $d$ and $e$ and the third side, representing the pressure P, formed by the lever arm $n$ and its extension (shown in dotted lines) to meet the side $d$. With the side $d$ of the triangle representing the driving force K, we have $$P = \frac{K}{\sin \phi}$$

The resisting force necessary to disrupt the drive may then be found as follows:

Let $a$=coefficient of friction then any force greater than P$a$=force necessary to cause slippage on surface $c$ but since $$P = \frac{K}{\sin \phi}$$

any force greater than $$\frac{Ka}{\sin \phi} =$$

force necessary to cause slippage on surface $c$.

Since the pressure between the wall 13 of the driving element A and the roller 19 is equal to the pressure between said roller and the surface $c$ of the balancer 18, then the total force necessary to disrupt the drive must be greater than any force equal to $$\frac{2Ka}{\sin \phi}$$

For example, to find the angle $\phi$ when $K$=100 lbs.

$a$=0.03 and it is required to disrupt the driving connections when the resisting force has reached a magnitude of any force greater than 110 lbs.

$$\frac{2Ka}{\sin \phi} =$$

a force such that any force greater will cause disruption, or $$\frac{2 \text{ times } 100 \text{ times } 0.03}{\sin \phi} = 110$$

$$\sin \phi = 0.05454$$

and $$\phi = 3° - 7'$$

It will thus be apparent that the common tangent to the surface $c$ and the roller 19 must be substantially at an angle of 3°—7' to the line of action of the driving force at the point of engagement of said roller with the driving element A, to cause disruption of the driving connections under the above conditions if any greater force is applied.

To provide for the taking up of wear on the roller 19, the surface $c$ is designed with a definite relation to the balancer 18 to keep the angle $\phi$ constant regardless of the operative position of the roller relative to said surface. For this purpose a radial line $j$ is drawn from the center of rotation $o$ through the point of engagement of the roller 19 with the driving element A. A line $l$ is then drawn from the center $f$ of the roller through the point of tangency of the roller with the surface $c$, which makes an angle equal to $\phi$ for the reason that the lines $j$ and $l$ bear a similar relation to the lines $d$ and $e$, respectively. Then with a radius equal to the distance from the center of rotation $o$ to the point of engagement of the roller with the balancer, and said point of engagement as a center, an arc is struck intersecting line $l$ at $w$. With the point $w$ as a center and the same radius indicated at $s$, an arc extending from the point of tangency of the line $e$ with the roller 19 to the periphery of the balancer 18 is then drawn. This arc forms the surface of the portion $c$ of the recess 21 and keeps the angle $\phi$ constant for any operative position of the roller thereon.

From the foregoing discussion of the design it should be apparent that any relation between the driving and resisting forces for breaking the driving connections can be had by changing the angle $\phi$, the operative portion $c$ of the recess 21 being designed in accordance with said angle as above described.

If the angle $\phi$ is equal to zero as shown in the diagram of Fig. 5, we have $$\frac{2Ka}{\sin 0°}$$

for the resisting force necessary to disrupt the driving connections. Since the sine of a zero angle equals 0, $$\frac{2Ka}{0}$$

equals infinity which shows that mechanism can be built to drive continuously without disruption.

Another mechanism embodying the invention is illustrated in Figs. 6 to 10 inclusive. This mechanism comprises a driving shaft 62 and a driven shaft 64. A member 69 is suitably keyed upon the driving shaft 62 and a member 71 is suitably keyed upon the driven shaft 64. The members 69 and 71 are provided on adjacent faces with projecting cylindrical portions 90 and 91, respectively, the portion 91 being loosely received within an axial bore 92 in the cylindrical portion 90. A balancing member 96 is rotatably mounted upon the driving shaft 62 within an axial bore 93 in the member 71. The member 96 is provided with a series of spaced axially extending recesses 99 adapted to receive rollers 97. The recesses 99 are each provided with an inoperative portion $b$ and an operative portion $c$. The shape of the operative portions $c$ is determined as described in connection with Figs. 1 to 5 inclusive for determining the shape of the operative portions $c$ of the recesses 21 of the balancing member 18. The cylindrical portion 91 is provided with a plurality of slots 94 through which the rollers 97 extend so that they may be brought into operative engagement with the inner surface of the cylindrical portion 90. Peripherally extending recesses 7 are provided in the cylindrical portion 91 communicating with the slots 94 for housing springs 115 which are adapted to urge shoes 5 into engagement with the rollers 97.

The member 96 also is provided with a plurality of recesses 100, each of which is provided with an inoperative portion $b$ and an operative portion $c$. The relationship of the operative to the inoperative portions of the recesses 100 is reversed with respect to the relationship of the operative and inoperative portions of the recesses 99. A roller 98 is operatively positioned in each of the recesses 100 and projects through a slot 95 in the cylindrical portion 91, there being a spring pressed shoe 6 engaging each of the rollers 98. Thus, this portion of the mechanism provides means for providing a driving connection between the shafts 62 and 64 when either the shaft 62 or 64 acts as the driving element for rotation in a clockwise direction as viewed from the left of Fig. 6.

In addition the member 96 is provided with a hub portion 25 having a plurality of spiral grooves 26. The member 71 is provided with an axial bore 27 adapted to receive for axial movement therein a disc 28 surrounding the hub 26 and having a plurality of ribs 29 adapted to engage the grooves 26. A disc 30 surrounds and is loosely mounted upon the hub $y$ of the member 71 and is provided on its outer periphery with an annular groove 31 adapted to receive one end of a lever 32 pivotally mounted upon a stud 33. A plurality of rods 34 extend through and are slidably mounted in openings 35 in the member 71 and each is connected at its opposite ends to the discs 28 and 30. The discs 28 and 30 normally are urged to the right, as viewed in Fig. 6, by a spring 36 surrounding the hub with one end engaging the member 71 and its other end engaging the disc 30.

Thus, it will be apparent in view of the foregoing description that a driving connection is afforded between the shafts 62 and 64 and the balancing member 96 regardless of whether the shaft 62 or the shaft 64 is acting as the driving element. If it is desired to release the driving connections between the shafts 62 and 64 and the balancing member 96, the lever 32 is actuated about its pivot 33 to move the discs 28 and 30 axially toward the left, as viewed in Fig. 6, thereby causing the balancing member 96 to be rotated as a result thereof relative to the driving shaft 62, thus disrupting the driving connection between the shafts 62 and 64 and the balancing member 96. The mechanism illustrated in Figs. 6 to 10 inclusive is a clutch mechanism embodying the basic principles underlying the present invention and illustrates one of the various mechanisms which may embody the invention.

I claim:

1. The combination of a driving element, a driven element, a rotatable member, means for providing a driving connection between said member and said elements adapted to receive opposed forces, one of said forces acting to disconnect said driving connection and including a force responsive to the torque of said driven element, the other of said forces acting to maintain said driving connection and including a force responsive to the torque of said driving element, whereby said driving connection is disconnected when the force including that responsive to the torque of the driven element exceeds the other of said opposed forces, and means operative when said driven element is acting as a driving element to provide a driving connection between said member and said elements and receive other opposed forces, one of said other opposed forces acting to maintain the driving relation between said member and said elements and including a force responsive to the torque of said driven element when the latter is acting as a driving element.

2. The combination of a driving element, a driven element, a rotatable member, means for providing a driving connection between said member and said elements adapted to receive opposed forces, one of said forces acting to disconnect said driving connection and including a force responsive to the torque of said driven element, the other of said forces acting to maintain said driving connection and including a force responsive to the torque of said driving element, whereby said driving connection is disconnected when the force including that responsive to the torque of the driven element exceeds the other of said opposed forces, means operative when said driven element is acting as a driving element to provide a driving connection between said member and said elements and receive other opposed forces, one of said other opposed forces acting to maintain the driving relation between said member and said elements and including a force responsive to the torque of said driven element when the latter is acting as a driving element, and manually operable means adapted to rotate said member to render said driving connections inoperative.

3. The combination of a driving element, a driven element, a rotatable member, and means providing a driving connection between said member and said elements adapted to receive opposed forces responsive to the torques of said elements whereby said driving connection is disconnected when said force responsive to the torque of the driven element becomes a predetermined amount greater than the other of said opposed forces, said means including a member movable to engage said rotatable member, one of said members having a cam surface forming part of said means.

4. The combination of a driving element, a driven element, a rotatable member, and means providing a driving connection between said member and said elements adapted to receive opposed forces responsive to the torques of said elements whereby said driving connection is disconnected when said force responsive to the torque of the driven element becomes a predetermined amount greater than the other of said opposed forces, said means including rollers movable to engage said member, said member having a cam surface forming part of said means and adapted to cooperate with said rollers to lock the same between said member and one of said elements.

5. The combination of a driving element, a driven element, a rotatable member, means providing a driving connection between said member and said elements adapted to receive opposed forces responsive to the torques of said elements whereby said driving connection is disconnected when said force responsive to the torque of the driven element becomes a predetermined amount greater than the other of said opposed forces, said means including rollers adapted to engage said member, said member having a cam surface forming part of said means and adapted to cooperate with said rollers to lock the same between said member and one of said elements, and means operative when said driven element is acting as a driving element to lock said member and said elements together and receive other opposed forces, one of said other opposed forces acting to maintain the locking relation between said member and said elements and being responsive to the torque of said driven element when the latter is acting as a driving element, said last mentioned means including rollers movable to engage said member, said member having a cam surface forming part of said last mentioned means and adapted to cooperate with said rollers to lock the same between said member and one of said elements.

6 The combination of a driving element, a driven element, a rotatable member, and means providing a driving connection between said member and said elements adapted to receive opposed forces responsive to the torques of said elements whereby said driving connection is disconnected when said force responsive to the torque of the driven element becomes a predetermined amount greater than the other of said opposed forces, and manually operable means adapted to rotate said member to render said driving connection inoperative.

CARROLL H. RICHARDS.